(12) United States Patent
Mukai et al.

(10) Patent No.: US 7,314,594 B2
(45) Date of Patent: Jan. 1, 2008

(54) HYDROGEN STORAGE ALLOY

(75) Inventors: Daisuke Mukai, Saitama (JP); Kiyotaka Yasuda, Saitama (JP); Mitsuhiro Wada, Saitama (JP); Yasunori Tabira, Saitama (JP); Shinya Kagei, Hiroshima (JP); Hidetoshi Inoue, Hiroshima (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 393 days.

(21) Appl. No.: 10/539,341

(22) PCT Filed: Dec. 26, 2003

(86) PCT No.: PCT/JP03/17024

§ 371 (c)(1),
(2), (4) Date: Jun. 16, 2005

(87) PCT Pub. No.: WO2004/061142

PCT Pub. Date: Jul. 22, 2004

(65) Prior Publication Data

US 2006/0068286 A1 Mar. 30, 2006

(30) Foreign Application Priority Data

Dec. 27, 2002 (JP) .............................. 2002-379008

(51) Int. Cl.
*C22C 19/00* (2006.01)
*H01M 4/38* (2006.01)

(52) U.S. Cl. .................................... 420/900; 429/218.2
(58) Field of Classification Search .................. 96/108; 420/900, 455; 429/12, 27, 40, 128, 218.2
See application file for complete search history.

(56) References Cited

U.S. PATENT DOCUMENTS

| 5,885,378 A | * | 3/1999 | Komada et al. | ............ 148/442 |
| 6,482,277 B2 | * | 11/2002 | Imoto et al. | ................ 148/513 |
| 6,824,592 B2 | * | 11/2004 | Monzyk et al. | .................. 96/4 |
| 7,005,212 B2 | * | 2/2006 | Sakai et al. | ............. 429/218.2 |

FOREIGN PATENT DOCUMENTS

| JP | 06-116665 | 4/1994 |
| JP | 2001-040442 | 2/2001 |
| JP | 2001-348636 | 12/2001 |
| JP | 2002-060865 | 2/2002 |
| JP | 2002-75347 | 3/2002 |

* cited by examiner

*Primary Examiner*—Frank M. Lawrence
(74) *Attorney, Agent, or Firm*—Steptoe & Johnson LLP

(57) ABSTRACT

A hydrogen storage alloy is provided which, when used in a battery, has high drain (power) performance and charge acceptance that are excellent, and in addition, cracks are few, and cycle life performance are excellent, to be used in large batteries, in particular for electric vehicles, hybrid electric vehicles, high-power use, and the like. The hydrogen storage alloy is a hydrogen storage alloy having phase conversion accompanying the variation of hydrogen storage capacity (H/M) and is in a single phase or in a state close to a single phase when the above-mentioned hydrogen storage capacity (H/M) is in a range of 0.3 to 0.7 or 0.4 to 0.6.

6 Claims, 6 Drawing Sheets

X :wt fraction (β ss)

X :wt fraction (β ss)

X :wt fraction ($\beta$ ss)

X :wt fraction ($\beta$ ss)

X :wt fraction (β ss)

X :wt fraction (β ss)

HYDROGEN STORAGE ALLOY

CROSS-REFERENCE TO RELATED APPLICATIONS

This application is entitled to the benefit of and incorporates by reference essential subject matter disclosed in International Application No. PCT/JP2003/017024 filed on Dec. 26, 2003 and Japanese Patent Application No. 2002-379008 filed on Dec. 27, 2002.

TECHNICAL FIELD

The present invention relates to a hydrogen storage alloy and, more specifically, to a hydrogen storage alloy which, when used in a battery, has excellent high drain (power) performance and charge acceptance; in addition, has very few pulverization and has excellent cycle life performance.

TECHNICAL BACKGROUND

In recent years, nickel-metal hydride batteries (secondary battery) using a hydrogen storage alloy for the negative electrode have been drawing attention as an alternative high-capacity alkaline battery to nickel-cadmium batteries.

Not only is the nickel-metal hydride battery already being used as a civil electric source in various small or portable devices, its application to a large battery for use in electric vehicles (EV: Electric Vehicle), hybrid electric vehicles (HEV: Hybrid Electric Vehicle: a vehicle wherein two power sources, i.e. electric motor and internal combustion engine, have been adopted), and the like has become practical.

Examples of main alloy systems being developed as hydrogen storage alloys for use in a negative electrode of a nickel-metal hydride battery include $AB_5$-type hydrogen storage alloys having a $CaCu_5$-type crystal structure, such as $LaNi_5$, and $AB_2$-type hydrogen storage alloys having a Laves phase structure, such as $ZrV_{0.4}Ni_{1.5}$. In recent years, $AB_5$-type hydrogen storage alloys have become mainstream as batteries in practical use.

Since the electrode cycle life is short with $LaNi_5$ as the $AB_5$-type hydrogen storage alloy, it cannot become a product that endures practical use. The resistance to corrosion in a hydrogen storage alloy using Mm (Misch metal), which is a mixture of rare-earth elements instead of La, and wherein a portion of Ni is further substituted with Co, is known to be improved.

In addition, the composition that is most generally used as the $AB_5$-type hydrogen storage alloy is the hydrogen storage alloy of the Mm—Ni—Co—Mn—Al system, wherein a portion of Ni has been further substituted with Mn and Al (for instance, see Japanese Patent Application Laid Open No. 2001-40442 and Japanese Patent Application Laid Open No. 2001-348636).

However, high power cannot be obtained over a long period with conventionally used $AB_2$-type and $AB_5$-type hydrogen storage alloys, such that they are insufficient, in particular, for application in a large battery for electric vehicles, hybrid electric vehicles, and the like. In addition, they have the problem that cracks occur in the hydrogen storage alloy.

DISCLOSURE OF THE INVENTION

It is an object of the present invention to provide a hydrogen storage alloy which, when used in a battery, has high drain (power) performance and charge acceptance that are excellent, and in addition, cracks are few, and cycle life performance are excellent for use in large batteries, in particular for electric vehicles, hybrid electric vehicles, high-power use, and the like.

The present inventors observed, as a result of examinations, that a hydrogen storage alloy presenting a single phase or a state close to a single phase in the range of hydrogen storage capacity, mainly used in the above-mentioned large battery for electric vehicles, hybrid electric vehicles, high-power use, and the like, can achieve the above-mentioned objective.

The present invention was completed based on the above observation and provides a hydrogen storage alloy which is a hydrogen storage alloy having phase conversion accompanying the variation of hydrogen storage capacity (H/M) and is in a single phase or in a state close to a single phase when the above-mentioned hydrogen storage capacity (H/M) is in a range of 0.3 to 0.7 or 0.4 to 0.6.

When the hydrogen storage alloy of the present invention is used in a battery, high drain (power) performance and charge acceptance are excellent within a given range; in addition, cracks are few; therefore, it is suitable for application as a negative electrode of a large battery, in particular for electric vehicles, hybrid electric vehicles, high-power use, and the like.

BEST MODE TO CARRY OUT THE INVENTION

In the following, the modes for carrying out the present invention will be described.

The hydrogen storage alloy of the present invention is a hydrogen storage alloy having phase conversion that accompanies the change in hydrogen storage capacity (H/M). It is a hydrogen storage alloy that undergoes phase conversion, for instance, α phase→mixed phase of α phase and β phase→β phase, accompanying the increase in hydrogen storage capacity. Consequently, hydrogen storage alloy without phase conversion, such as amorphous, is not included. Herein, α phase means a phase having a structure wherein hydrogen is in solid solution in the alloy, and β phase means a phase that has a different crystal structure from the α phase; they are not a so-called hydride phase but a different solid solution phase. Specifically, in the case of Example 1, α phase means a solid-solution phase having a hexagonal crystal structure, and β phase means a solid-solution phase having a hexagonal crystal structure or a trigonal crystal structure.

The hydrogen storage alloy of the present invention presents a single phase or a state close to a single phase in the range of hydrogen storage capacity, mainly used in a large battery for electric vehicles, hybrid electric vehicles, high-power use, and the like; that is to say, a range of hydrogen storage capacity (H/M) of 0.3 to 0.7 or hydrogen storage capacity (H/M) of 0.4 to 0.6.

Herein, although single phase means a simple solid solution, it does not have to be 100%, and it is sufficient if not less than 80% is single phase. In addition, a state close to a single phase means a state where not less than 60% is single phase.

If not less than 60%, preferably not less than 80%, is single phase of the simple solid solution, the alloy can absorb or desorb hydrogen without alteration of the crystal structure during high-power charging or discharging in an electric vehicle or a hybrid electric vehicle (HEV); furthermore, since the alloy hardly crack, not only is the cycle life excellent, but activity and high drain (power) performance become excellent since no energy for phase conversion is required.

On the other hand, if the proportion of single phase of the simple solid solution is below 60%, the activity required, as a negative electrode of a battery for an electric vehicle, a hybrid electric vehicle, or a secondary high-power nickel-metal hydride battery, and high drain (power) performance at low temperatures become poor. For instance, when the following Examples 1 to 5 and Comparative Example 1 are compared, in Comparative Example 1, the activity and the pulse value, which represents the power performance at low temperature, show low values compared to Examples 1 to 5.

Figure 1:
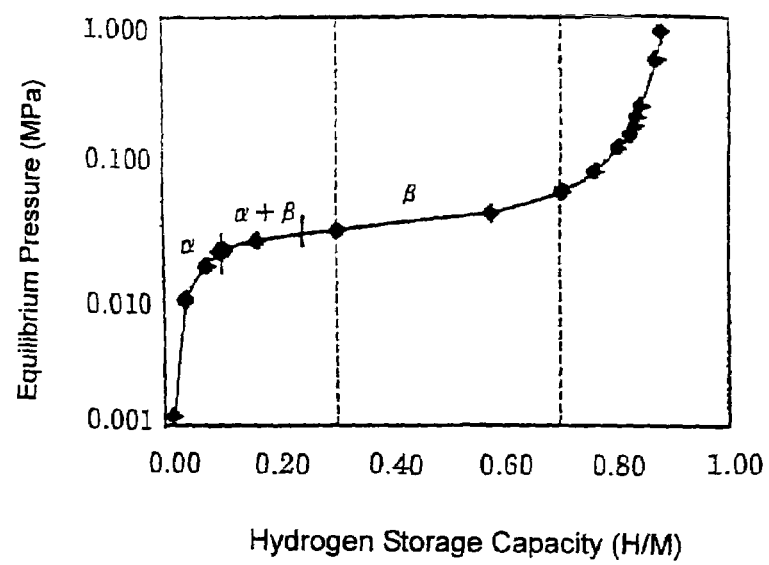
FIG. 1 is a PCT (Pressure-composition isotherms) curve of the hydrogen storage alloy of an example of the present invention.
Figure 2:
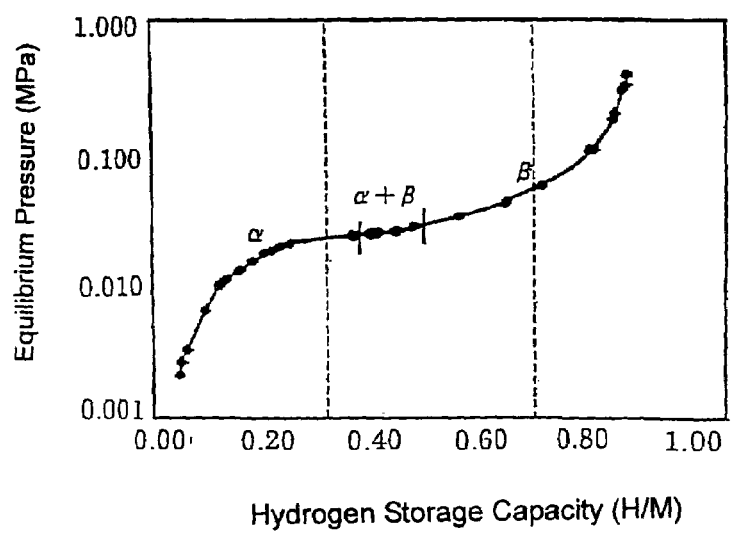
FIG. 2 is a PCT (Pressure-composition isotherms) curve of a hydrogen storage alloy as an example of a comparative alloy.

The above will be explained based on the figures. FIG. 1 is a PCT (Pressure-composition isotherms) curve of the hydrogen storage alloy of a typical example of the present invention; FIG. 2 is a PCT (Pressure-composition isotherms) curve of the comparative hydrogen storage alloy.

In FIG. 1, the hydrogen storage alloy of the present invention changes from the α phase to a mixed phase of α phase and β phase concomitantly to the increase in the hydrogen storage capacity. The hydrogen storage capacity is in the range of 0.10 to 0.30 for this mixed phase. Accompanying a further increase in the hydrogen storage capacity, the hydrogen storage alloy changes from the mixed phase of α phase and β phase to the β phase. This β phase appears at 0.30 or above and exists in the range of at least 0.30 to 0.70.

On the other hand, in FIG. 2, the comparative hydrogen storage alloy changes from the α phase to the mixed phase of α phase and β phase, as did the above-mentioned hydrogen storage alloy of the present invention. The hydrogen storage capacity is in the range of 0.40 to 0.55 for this mixed phase. The hydrogen storage alloy changes from the mixed phase of α phase and β phase to the β phase, accompanying a further increase in the hydrogen storage capacity. The hydrogen storage capacity of this β phase is not less than 0.55. Consequently, the range of hydrogen storage capacity of 0.30 to 0.70 is a range where the mixed phase of α phase and β phase, and the β phase coexist.

Figure 3:
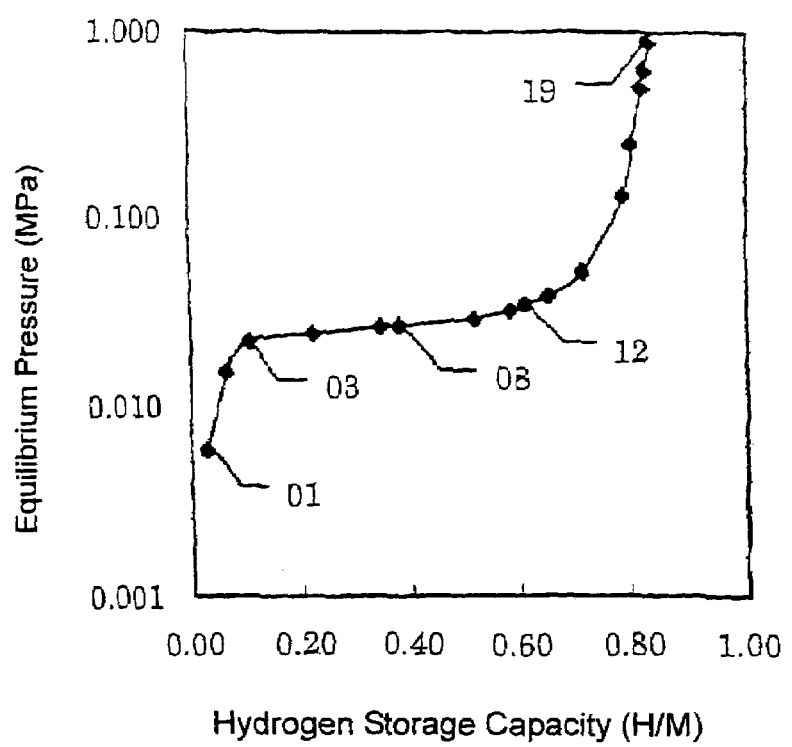
FIG. 3 is a PCT (Pressure-composition isotherms) curve of a hydrogen storage alloy as an example of a comparative alloy.
Figure 4:
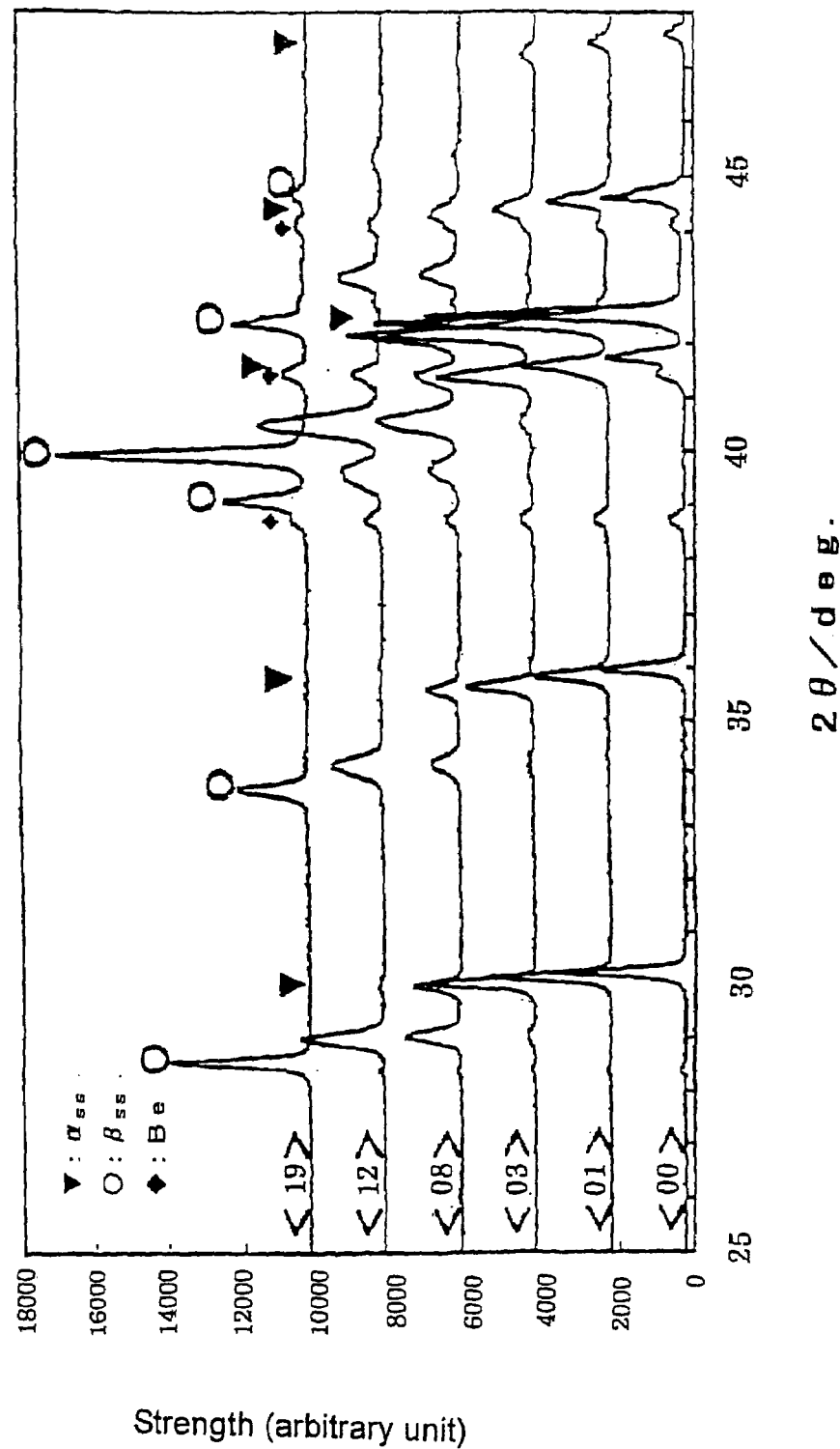
FIG. 4 shows an x-ray profile of each hydrogen storage capacity of the PCT curve shown in FIG. 3.

Among those executed as shown in FIG. 2, the PCT curve and the x-ray profile of a representative comparative hydrogen storage alloy are respectively shown in FIG. 3 and FIG. 4.

As illustrated in FIG. 4, at <00>, <01>, and <03> of FIG. 3, only the α phase exists, a mixed phase of α phase and β phase exists at <08>, and only the β phase exists at <12> and <19>. That is to say, with this comparative hydrogen storage alloy, a mixed phase of α phase and β phase exists at a hydrogen storage capacity of 0.4 (above-mentioned <08>).

The assessment of whether there is a single phase or a state close to a single phase in a specific usage range, for instance, at H/M=0.4 to 0.6, can be made by drawing a graph that shows the proportion of β-phase content versus the total amount of hydrogen storage alloy, as shown in FIG. 5 to FIG. 8, and make the assessment taking into consideration the proportion of β-phase change in the specific usage range in question. The assessment can also be made as follows.

That is to say, since the proportion of β phase at H/M=0.4 ($R\beta_{0.4}$) and the proportion of β phase at H/M=0.6 ($R\beta_{0.6}$) can be determined, and if the ratio of $R\beta_{0.4}$ with respect to $R\beta_{0.6}$ ($R\beta_{0.4}/R\beta_{0.6}$) is close to 1, the determination would be that there is little phase conversion, and therefore, the state is close to single phase; if $R\beta_{0.4}/R\beta_{0.6}$=0.6 or more, a state close to a single phase can be assessed; in addition, if $R\beta_{0.4}/R\beta_{0.6}$=0.8 or more, a single phase can be assessed. The same holds for the range of H/M=0.3 to 0.7.

Note that, the proportion of β phase can be determined as described below by determining the x-ray diffraction pattern using an In-situ XRD device and carrying out a Rietveld analysis of the results.

To prepare the hydrogen storage alloy of the present invention, it is obtained by a stringent specification of the alloy composition and selection of the manufacturing conditions, such as casting conditions and heat-treatment conditions according to the alloy composition, and control. Specifically, a hydrogen storage alloy, wherein a hydrogen storage alloy represented by the General Formula $MmNi_a Mn_b Al_c Co_d$ (in the formula, Mm represents Misch metal, $3.7 \leq a \leq 4.7$, $0.3 \leq b \leq 0.65$, $0.2 \leq c \leq 0.5$, preferably $0.2 \leq c \leq 0.3$, $0 \leq d \leq 0.4$ and $4.9 \leq a+b+c+d \leq 5.5$), for instance, having an alloy composition such as Mm(20 wt % La)$Ni_{4.07}Mn_{0.36}Al_{0.32}Co_{0.40}$, Mm(20 wt %La)$Ni_{4.30}Mn_{0.50}Al_{0.35}Co_{0.15}$, Mm(20 wt % La)$_{1.01}Ni_{4.2}Mn_{0.50}Al_{0.30}Co_{0.30}$, and Mm(20 wt % La)$Ni_{4.35}Mn_{0.50}Al0.35Co_{0.10}$, is prepared under given conditions by a template casting method and further heat-treated under given conditions, and the like, may be cited.

Since the hydrogen storage alloy of the present invention presents a single phase or a state close to a single phase when the hydrogen storage capacity is in a given range, the high drain (power) performance and the charge acceptance are excellent when used within this range in a battery; in addition, since cracks are few, it can be used in a negative electrode of a large battery for, particularly preferably, an electric vehicle, a hybrid electric vehicle, and the like. In particular, regarding high drain (power) performance, it was observed that, with the hydrogen storage capacity in a given range, the larger the proportion of β phase, the more merit for the high drain (power) performance.

EXAMPLES

In the following, the present invention will be described concretely based on examples and the like.

Comparative Example 1

Each raw material for the hydrogen storage alloy was weighed and mixed so that Mm, Ni, Mn, Al, and Co give Mm(11 wt % La)$Ni_{3.55}Mn_{0.40}Al_{0.30}Co_{0.75}$ ($AB_{5.00}$) in alloy composition; this mixture was placed in a crucible, immobilized in an induction melting furnace, and the vacuum was brought to $10^{-4}$ torr or less, whereafter the mixture was melted by heating in an argon gas atmosphere, then poured into a mold and cast at 1430° C. to obtain an alloy. In addition, this alloy was heat-treated in an argon gas atmosphere at 1060° C. for 3 hours to obtain a hydrogen storage alloy.

Example 1

Each raw material for the hydrogen storage alloy was weighed and mixed so that Mm, Ni, Mn, Al, and Co give Mm(20 wt % La)Ni$_{4.07}$Mn$_{0.36}$Al$_{0.32}$Co$_{0.40}$ (AB$_{5.15}$) in alloy composition; this mixture was placed in a crucible, immobilized in an induction melting furnace, and the vacuum was brought to $10^{-4}$ torr or less, whereafter the mixture was melted by heating in an argon gas atmosphere, then poured into a mold and cast at 1430° C. to obtain an alloy. In addition, this alloy was heat-treated in an argon gas atmosphere at 1080° C. for 3 hours to obtain a hydrogen storage alloy.

Example 2

Each raw material for the hydrogen storage alloy was weighed and mixed so that Mm, Ni, Mn, Al, and Co give Mm(20 wt % La)$_{1.01}$Ni$_{4.2}$Mn$_{0.50}$Al$_{0.30}$Co$_{0.30}$ in alloy composition; this mixture was placed in a crucible, immobilized in an induction melting furnace, and the vacuum was brought to $10^{-4}$ torr or less, whereafter the mixture was melted by heating in an argon gas atmosphere, then poured into a mold and cast at 1420° C. to obtain an alloy. In addition, this alloy was heat-treated in argon gas atmosphere at 1060° C. for 5 hours to obtain a hydrogen storage alloy.

Example 3

Each raw material for the hydrogen storage alloy was weighed and mixed so that Mm, Ni, Mn, Al, and Co give Mm (20 wt % La)Ni$_{4.35}$Mn$_{0.50}$Al$_{0.05}$Co$_{0.10}$ in alloy composition; this mixture was placed in a crucible, immobilized in an induction melting furnace, and the vacuum was brought to $10^{-4}$ torr or less, whereafter the mixture was melted by heating in an argon gas atmosphere, then poured into a mold and cast at 1460° C. to obtain an alloy. In addition, this alloy was heat-treated in an argon gas atmosphere at 1080° C. for 9 hours to obtain a hydrogen storage alloy.

Example 4

Each raw material for the hydrogen storage alloy was weighed and mixed so that Mm, Ni, Mn, Al, and Co give Mm(20 wt % La)Ni$_{4.30}$Mn$_{0.50}$Al$_{0.35}$Co$_{0.15}$ in alloy composition; this mixture was placed in a crucible, immobilized in an induction melting furnace, and the vacuum was brought to $10^{-4}$ torr or less, whereafter the mixture was melted by heating in an argon gas atmosphere, then poured into a mold and cast at 1440° C. to obtain an alloy. In addition, this alloy was heat-treated in an argon gas atmosphere at 1080° C. for 10 hours to obtain a hydrogen storage alloy.

Example 5

Each raw material for the hydrogen storage alloy was weighed and mixed so that Mm, Ni, Mn, Al, and Co give Mm(20 wt % La)Ni$_{4.07}$Mn$_{0.36}$Al$_{0.32}$Co$_{0.40}$ (AB$_{5.15}$) in alloy composition; this mixture was placed in a crucible, immobilized in an induction melting furnace, and the vacuum was brought to $10^{-4}$ torr or less, whereafter the mixture was melted by heating in an argon gas atmosphere, whereafter it was poured at 1450° C. onto a copper water-cooled roll rotating with a rotation speed of 1500 rpm to cool and spatter the melt, and a scale-shaped hydrogen storage alloy was obtained. In addition, this alloy was heat-treated in an argon gas atmosphere at 1080° C. for 3 hours to obtain a hydrogen storage alloy.

The graphs showing the proportion of β-phase content versus the amount of hydrogen storage alloy for each hydrogen storage alloy of Comparative Example 1 and Examples 1 to 5 are shown in FIG. 5 to FIG. 10.

In addition, for each hydrogen storage alloy of Comparative Example 1 and Examples 1 to 5, the proportion of β phase (Rβ$_{0.4}$) at H/M=0.4 and the proportion of β phase (Rβ$_{0.6}$) at H/M=0.6 were determined, ratio Rβ$_{0.4}$ over Rβ$_{0.6}$ (Rβ$_{0.4}$/Rβ$_{0.6}$) was calculated, and this value, together with the battery characteristics values, are shown in Table 1.

Note that means for determining the proportion of β-phase content is described in the following.

Figure 5:
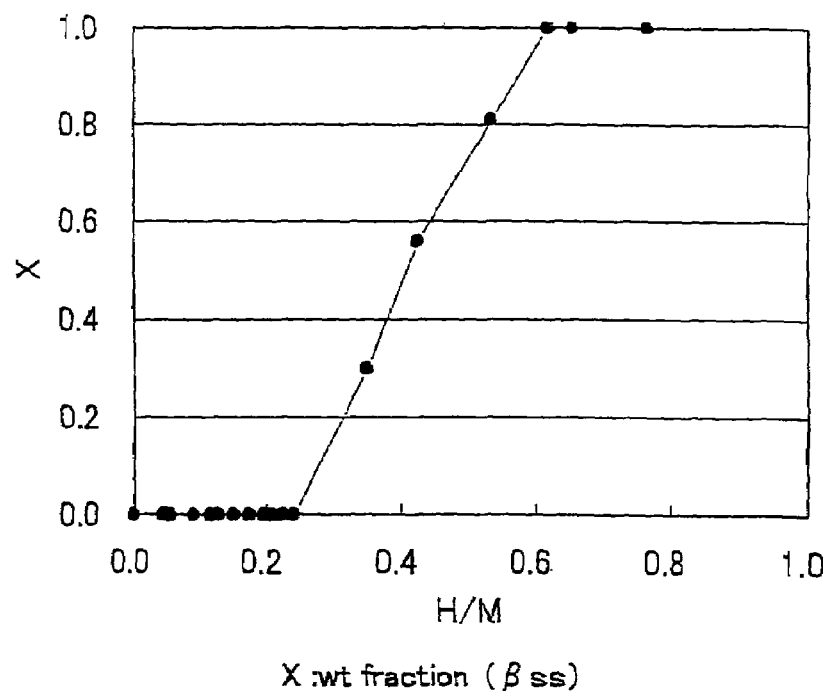
FIG. 5 is a graph showing the proportion of β-phase content versus the amount of hydrogen storage alloy in Comparative Example 1.

As is clear from FIG. 5, the fact that an abrupt increase in the proportion of β-phase content is observed when the hydrogen storage capacity is in the 0.3 to 0.7 range reveals that the hydrogen storage alloy of Comparative Example 1 is neither in a single phase comprising the β phase only, nor in a state close to a single phase in this range.

Also from Table 1, the fact that Rβ$_{0.4}$/Rβ$_{0.6}$=0.47 confirms that the hydrogen storage alloy of Comparative Example 1 is neither in a single phase comprising the β phase only, nor in a state close to a single phase in the hydrogen storage capacity range of 0.4 to 0.6.

Figure 6:
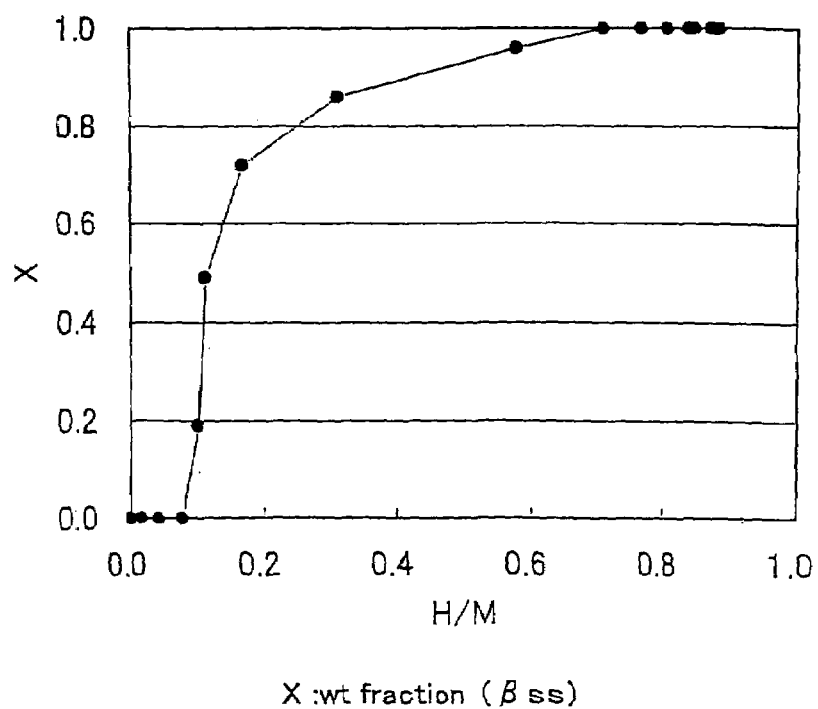
FIG. 6 is a graph showing the proportion of β-phase content versus the amount of hydrogen storage alloy in Example 1.

On the other hand, as is clear from FIG. 6, the fact that the proportion of β-phase content almost does not change in the hydrogen storage capacity range of 0.3 to 0.7 reveals that the hydrogen storage alloy of Example 1 is in a single phase comprising the β phase only in this range.

In addition, when observing Table 1, the fact that Rβ$_{0.4}$/Rβ$_{0.6}$=0.90 confirms that the hydrogen storage alloy of Example 1 presents a single phase comprising the β phase only in the hydrogen storage capacity range of 0.4 to 0.6.

Figure 7:
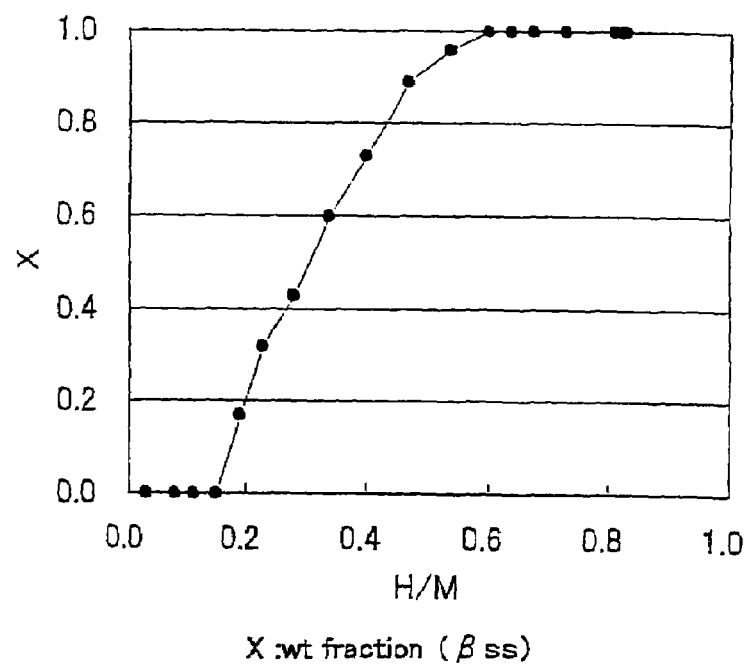
FIG. 7 is a graph showing the proportion of β-phase content versus the amount of hydrogen storage alloy in Example 2.

As is apparent from FIG. 7, the fact that no abrupt increase in the proportion of β-phase content is observed in the hydrogen storage capacity range of 0.3 to 0.7 allows one to determine that the hydrogen storage alloy of Example 2 is in a state close to a single phase of the β phase in this range.

In addition, when observing Table 1, the fact that Rβ$_{0.4}$/Rβ$_{0.6}$=0.73 allows one to confirm that the hydrogen storage alloy of Example 2 presents a state close to a single phase comprising the β phase in the hydrogen storage capacity range of 0.4 to 0.6.

Figure 8:
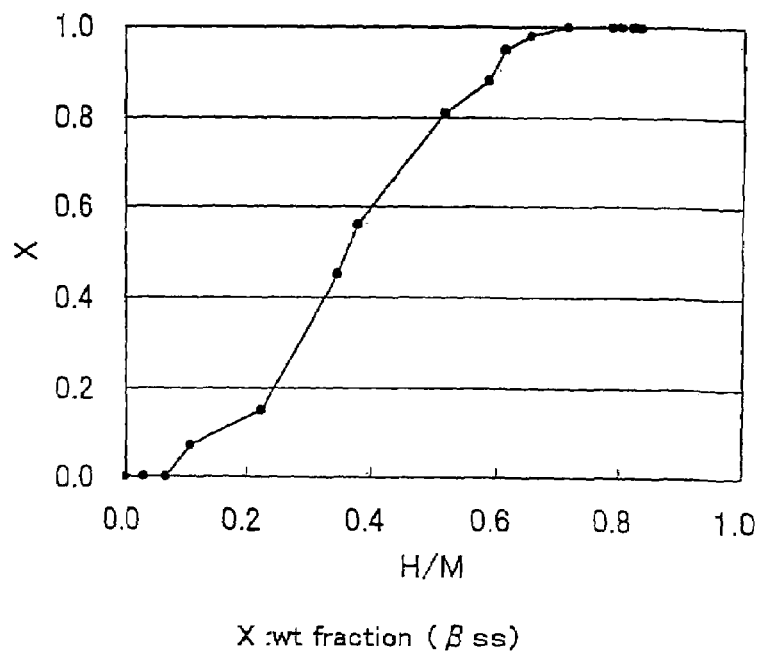
FIG. 8 is a graph showing the proportion of β-phase content versus the amount of hydrogen storage alloy in Example 3.
Figure 9:
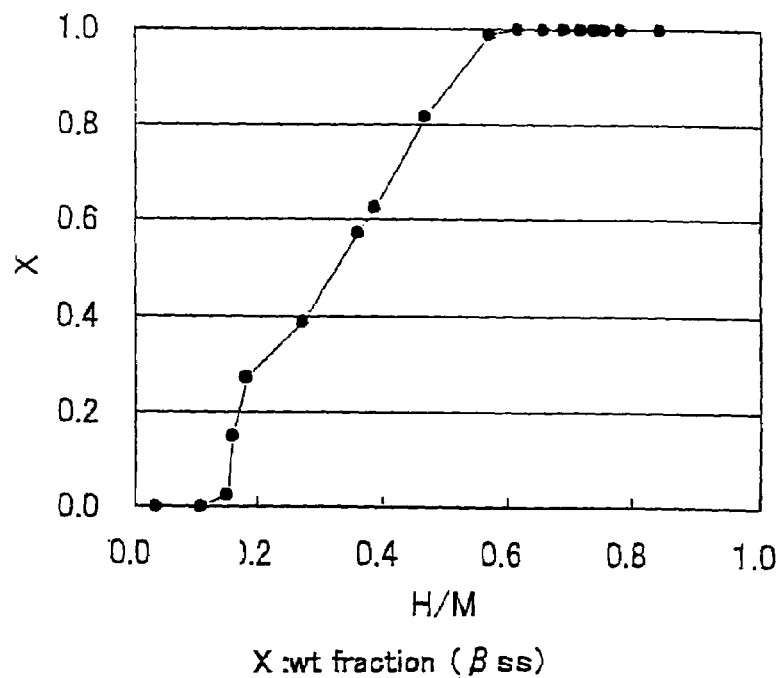
FIG. 9 is a graph showing the proportion of β-phase content versus the amount of hydrogen storage alloy in Example 4.

As is clear from FIG. 8 and FIG. 9, the fact that no abrupt increase in the proportion of β-phase content is observed in the hydrogen storage capacity range of 0.3 to 0.7 allows one to determine that hydrogen storage alloys of Example 3 and Example 4 are in a state close to a single phase comprising the β phase in this range.

In addition, when observing Table 1, the fact that Rβ$_{0.4}$/Rβ$_{0.6}$=0.64 allows one to confirm that the hydrogen storage alloys of Example 3 and Example 4 present a state close to a single phase comprising the β phase in a hydrogen storage capacity range of 0.4 to 0.6.

Figure 10:
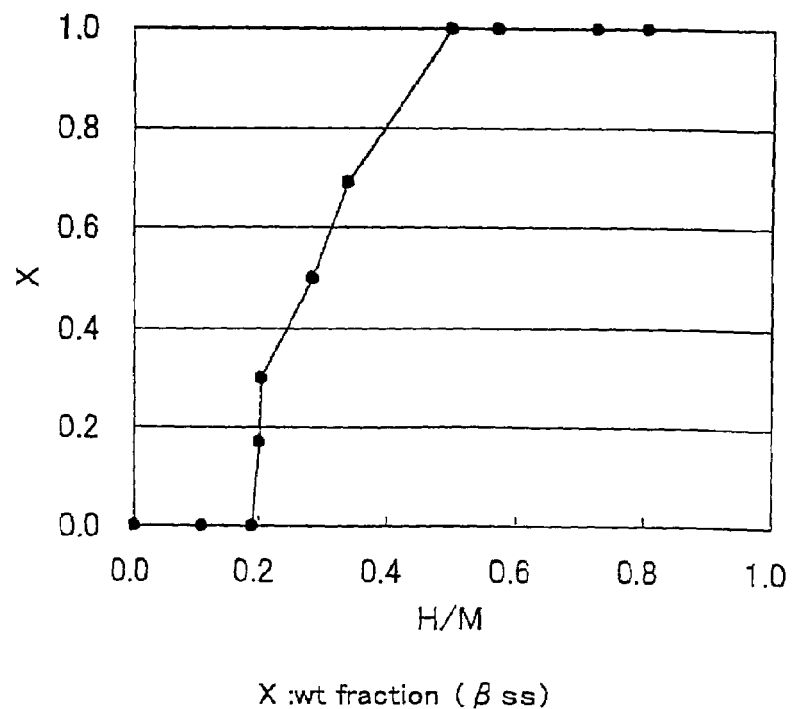
FIG. 10 is a graph showing the proportion of β-phase content versus the amount of hydrogen storage alloy in Example 5.

As is clear from FIG. 10, the fact that the proportion of β-phase content almost does not change in the hydrogen storage capacity range of 0.3 to 0.7 reveals that the hydrogen storage alloy of Example 5 is in a single phase, comprising the β phase only in this range.

In addition, when observing Table 1, the fact that Rβ$_{0.4}$/Rβ$_{0.6}$=0.80 confirms that the hydrogen storage alloy of Example 5 presents a single phase comprising the β phase only in the hydrogen storage capacity range of 0.4 to 0.6.

Note that, although the hydrogen storage alloy of Example 5, at the time of the 27 Dec. 2002 application, was described as Comparative Example 2 due to the observation of an abrupt increase in the proportion of β-phase content in the range of 0.3 to 0.7, and also a low activity of 60% or less, resulting from repeating the experiment thereafter, the initial measurement value turned out to be erroneous, and the measurement value of Example 5 of the present application is correct.

[Evaluation of the Characteristics]

Preparation of test cell and evaluation of half cell characteristics were carried out for the hydrogen storage alloys obtained in Examples 1 to 5 and Comparative Example 1 according to the method described below. The results are shown in Table 1.

<Preparation of Test Cell>

Hydrogen storage alloy powder, whose average particle size was adjusted to 45 microns, and nickel powder were pre-mixed together with polyethylene powder, the resulting mixed powder was pressed to create a pellet electrode with a diameter of 15 mm to serve as the negative electrode, and an open-type test cell was created and connected to a charger.

<Evaluation of Half Cell Characteristics>

1) Initial Activation Test
Charge: 0.2 C-120%; discharge: 0.2 C-0.7V cut
Cycle: 20 cycles
Temperature: 25° C.

2) Pulse Discharge Characteristics
After the end of twenty cycles (initial activation test), charge: 0.2 C-120%; discharge: depth of discharge 50%; 0.5 h pause; voltage value of 2 C-10 S (temperature: 0° C.)

3) Activity
Value of activity calculated from the discharge capacity when a low temperature charge (0° C., 1 C) was given at cycles 4 to 5 ($5^{th}$ cycle) and 16 to 17 ($17^{th}$ cycle) during the activation test in an open-type cell.
  charge: 1 C-120%; discharge: 1 C-0.7V cut (temperature: 0° C.)
  cycle: 100 cycles (activity)=(discharge capacity at the $5^{th}$ cycle/discharge capacity at the $17^{th}$ cycle)×100

4) Cycle Life Test
charge: 1 C-120%; discharge: 1 C-0.7V cut (temperature: 25° C.)
cycle: 100 cycles
electrode cycle life (retention ratio)

After the above-mentioned cycle life test, discharge capacity at a charge of 0.2 C-120% and a discharge of 0.2 C-0.7V cut was measured, and the ratio with respect to the discharge capacity after activation test was defined as the retention capacity ratio.

(capacity retention ratio)=(discharge capacity after 100 cycles/discharge capacity after 20 cycles)×100

In Table 1, the indices are shown with the retention ratio of Comparative Example 1 taken as 100.

As is clear from the results of Table 1, compared to Comparative Example 1, Examples 1 to 5 all had excellent half cell characteristics (pulse discharge characteristics and activity).

[Calculation of the Ratio of β Phase Present]

The ratio of β phase present was determined by the following method for the hydrogen storage alloys obtained in Examples 1 to 5 and Comparative Example 1.

Specifically, the ratio of β phase present was determined using a powder x-ray diffractometer (XRD) to determine the x-ray diffraction pattern of each hydrogen storage capacity and carrying out a Rietveld analysis thereof.

1) MH Alloy Activation Treatment

Samples obtained by grinding ingots of hydrogen storage alloys prepared in the Examples and the Comparative Example (hereinafter referred to as "MH alloys") and adjusting the granularity to 20-32 μm were weighed in the amount of 2 g and placed in a PCT holder.

Then, the surface of the MH alloy was cleaned twice with hydrogen at a hydrogen pressure of 1.75 MPa, whereafter activation treatment was carried out twice while introducing 3 MPa of hydrogen.

After the end of the activation treatment, an operation where 3 MPa of hydrogen gas was introduced into the aforementioned 2.0 g of MH alloy powder to store hydrogen, and then vacuuming to degas hydrogen was carried out ten times (45° C.), with a PCT apparatus (automatic Sieverts apparatus (manufactured by Suzuki Shokan)).

2) Filling of the In-situ XRD Apparatus with Sample

A sample holder for in-situ XRD vacuumed to 0.3 MPa was filled with a sample which hydrogen was absorbed into and desorbed from 10 times, as described above, and was set onto the sample stage (chamber portion).

Note that a beryllium plate and a tie made of Cu were firmly screwed so as to prevent spilling of the sample during setting.

3) Setting of the Sample Holder in the In-Situ XRD Apparatus

The sample holder was set onto the sample stage (chamber portion), whereafter the holder was vacuumed again for fastening; then, after verifying that on the order of $10^{-4}$ torr was pulled, evacuation was further carried out to $2\times10^{-5}$ torr or below.

4) Activation Treatment of the Sample

The temperature setting of the heater was brought to 200° C., hydrogen was introduced into the chamber portion up to 3 MPa, hydrogen absorption was checked with the pressure gauge recorder to wait until equilibrium was reached, and when the hydrogen equilibrium was confirmed, the peak of the hydride was identified with XRD (peak near 25-30°).

TABLE 1

| | Fraction of β phase | | Relative | Half Cell characteristics | | |
|---|---|---|---|---|---|---|
| | $R\beta_{0.4}$ (H/M = 0.4) | $R\beta_{0.6}$ (H/M = 0.6) | ratio ($R\beta_{0.4}/R\beta_{0.6}$) | Pulse/V | Activity/% | Retention ratio/% |
| Comparative Example 1 | 0.47 | 1.00 | 0.47 | 1.10 | 36 | 100 |
| Example 1 | 0.88 | 0.98 | 0.90 | 1.16 | 81 | 100 |
| Example 2 | 0.73 | 1.00 | 0.73 | 1.16 | 77 | 100 |
| Example 3 | 0.59 | 0.92 | 0.64 | 1.16 | 86 | 100 |
| Example 4 | 0.64 | 1.00 | 0.64 | 1.16 | 83 | 100 |
| Example 5 | 0.80 | 1.00 | 0.80 | 1.15 | 75 | 100 |

*The percentage of the retention ratio is value with Comparative Example 1 taken as 100.

This operation was repeated 3 to 4 times to carry out the activation treatment inside the in-situ XRD apparatus.

When the activation treatment was finished, the heater portion was heated at 200° C. for 2 hours, and degassing was carried out to degas hydrogen from the sample.

5) Measurement of the Volume of the Sample Portion

Next, since with hydrogen gas the hydrogen storage alloy would store the hydrogen, the introduced gas was switched to He gas to measure the volume of the sample portion. That is to say, He gas was introduced into the Sieverts portion, and the pressure at that time was recorded (P1). Next, the valve of the chamber portion was opened, the pressure at that time was recorded (P2), and evacuation by vacuum was carried out. The above operation was performed 3 to 5 times to measure the volume of the chamber portion (V2).

For the calculation method, the calculation was performed with the following formula:

$$P1V1=P2(V1+V2),\text{ where } V1 \text{ is a value that is already known (411.5 cc).}$$

When the above volume measurement was finished, the reaction gas was switched to hydrogen, and vacuuming of the chamber portion and the Sieverts portion (to $2\times10^{-5}$ torr and below) was performed.

6) In-situ XRD Measurement Method

First, the XRD before hydrogen absorption was measured. XRD conditions were as follows:

XRD apparatus: XRD apparatus manufactured by RIGAKU

XRD tube: Cu measurement angle: 10° to 100° scanning speed: 1°/min reaction gas: ultra-pure hydrogen gas (7N)

Ensuring that all the valves were shut, a prescribed amount of hydrogen was introduced from the hydrogen introduction valve, and the pressure P1 at that time, as well as the ambient temperature T1 of the apparatus, was recorded.

Next, MH alloy and hydrogen were reacted. Whether equilibrium was reached or not was confirmed by the recorder that is coupled to the pressure gauge.

After verification, with the recorder and the pressure gauge, that the equilibrium was reached, measurements were carried out with the above-mentioned conditions of XRD.

While drawing PCT curves, such manipulations and sequential measurements were carried out until the equilibrium hydrogen pressure became 0.5 MPa.

7) Rietveld Analysis

The ratio of β phase of the x-ray diffraction pattern as described above was calculated by Mr. Fujio Izumi's Rietveld analysis.

The specific method of Mr. Fujio Izumi's Rietveld analysis is shown in Fujio Izumi, "Actuality of Powder X-Ray Analysis" initial print, Chapter 7 to Chapter 11 (p 97 to 176), or http://homepage.mac.com/fujioizumi.

The invention claimed is:

1. A hydrogen storage alloy, which is a hydrogen storage alloy having phase conversion accompanying the variation of hydrogen storage capacity (H/M), and is in a single phase or in a state close to a single phase when said hydrogen storage capacity (H/M) is in a range of 0.3 to 0.7.

2. The hydrogen storage alloy as recited in claim 1, wherein said hydrogen storage capacity (H/M) is in a range of 0.4 to 0.6.

3. The hydrogen storage alloy as recited in claim 2, wherein the ratio ($R\beta_{0.4}R\beta_{0.6}$) of the proportion of β phase at a hydrogen storage capacity (H/M) of 0.4 ($R\beta_{0.4}$) with respect to the proportion of β phase at a hydrogen storage capacity (H/M) of 0.6 ($R\beta_{0.6}$) is not less than 0.6.

4. The hydrogen storage alloy as recited in claim 1, used in a negative electrode of a nickel-metal hydride secondary battery for electric vehicle and hybrid electric vehicle use, and for high-power use.

5. The hydrogen storage alloy as recited in claim 2, used in a negative electrode of a nickel-metal hydride secondary battery for electric vehicle and hybrid electric vehicle use, and for high-power use.

6. The hydrogen storage alloy as recited in claim 3, used in a negative electrode of a nickel-metal hydride secondary battery for electric vehicle and hybrid electric vehicle use, and for high-power use.

* * * * *